(12) United States Patent
Bryan et al.

(10) Patent No.: US 11,496,675 B2
(45) Date of Patent: Nov. 8, 2022

(54) REGION OF INTEREST BASED ADJUSTMENT OF CAMERA PARAMETERS IN A TELECONFERENCING ENVIRONMENT

(71) Applicant: Plantronics, Inc., Santa Cruz, CA (US)

(72) Inventors: David A. Bryan, Cedar Park, TX (US); Kui Zhang, Round Rock, TX (US); Varun Ajay Kulkarni, Cedar Park, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/229,684

(22) Filed: Apr. 13, 2021

(65) Prior Publication Data

US 2022/0329727 A1     Oct. 13, 2022

(51) Int. Cl.
*H04N 7/15*     (2006.01)
*H04N 5/232*    (2006.01)
*H04N 5/235*    (2006.01)

(52) U.S. Cl.
CPC ....... *H04N 5/23222* (2013.01); *H04N 5/2353* (2013.01); *H04N 7/15* (2013.01)

(58) Field of Classification Search
CPC . G06T 5/50; G06T 5/00; H04N 19/85; H04N 5/243; H04N 7/15; G06K 9/00
USPC ........................................... 348/14.01–14.16
See application file for complete search history.

(56) References Cited

U.S. PATENT DOCUMENTS

| | | | |
|---|---|---|---|
| 8,872,878 B2 | 10/2014 | Byers et al. | |
| 9,584,733 B2 | 2/2017 | Doepke | |
| 9,805,501 B2 | 10/2017 | Huang | |
| 9,843,761 B2 | 12/2017 | Thompson et al. | |

(Continued)

FOREIGN PATENT DOCUMENTS

| | | | | |
|---|---|---|---|---|
| DE | 102018110692 B3 | * | 4/2019 | ........... B24B 37/005 |
| EP | 3376756 A1 | * | 9/2018 | ......... H04N 5/23216 |
| JP | 2015188200 A | * | 10/2015 | ............... H04N 7/15 |

OTHER PUBLICATIONS

Hildebrandt, D., "How to Read and Use Histograms" Mar. 1, 2021, Digital Photography School.
(Continued)

*Primary Examiner* — Melur Ramakrishnaiah
(74) *Attorney, Agent, or Firm* — Ramey LLP; Jacob B. Henry

(57) ABSTRACT

A teleconferencing system, comprising: a camera, wherein the camera is configured to capture an image data stream comprising one or more image data frames in accordance with one or more image-capture parameters; and a processor coupled to the camera, wherein the processor is configured to: receive the image data stream from the camera; determine a region of interest within an image data frame of the image data stream; identify a sub-portion of the image data frame corresponding to the region of interest; evaluate a quality of image data corresponding to the sub-portion; determine that the quality of the image data corresponding to the sub-portion is below one or more predetermined quality thresholds; update one or more of the image-capture parameters of the camera, responsive to determining that the quality of the image data corresponding to the sub-portion is below the one or more predetermined quality thresholds.

21 Claims, 11 Drawing Sheets

(56) References Cited

U.S. PATENT DOCUMENTS

| | | | |
|---|---|---|---|
| 9,912,908 | B2 | 3/2018 | Feng |
| 10,091,412 | B1 | 10/2018 | Feng et al. |
| 10,148,913 | B2 | 12/2018 | Nimri et al. |
| 10,187,579 | B1 | 1/2019 | Wang et al. |
| 10,574,899 | B2 | 2/2020 | Wang et al. |
| 10,582,117 | B1 | 3/2020 | Tanaka |
| 2001/0019416 | A1* | 9/2001 | Monty ............... H04N 1/00968 358/1.9 |
| 2002/0196328 | A1 | 12/2002 | Piotrowski |
| 2012/0293606 | A1 | 11/2012 | Watson et al. |
| 2014/0063176 | A1 | 3/2014 | Modai et al. |
| 2018/0013950 | A1 | 1/2018 | Steinberg et al. |
| 2018/0176508 | A1 | 6/2018 | Pell |
| 2018/0262714 | A1* | 9/2018 | Kim ..................... G06F 3/0488 |
| 2019/0158733 | A1 | 5/2019 | Feng et al. |
| 2019/0260965 | A1 | 8/2019 | Morabia et al. |
| 2020/0073208 | A1* | 3/2020 | Duckstein .............. G03B 15/07 |

OTHER PUBLICATIONS

Mwiti, D., "Image Segmentation in 2021: Architectures, Losses, Datasets, and Frameworks", Feb. 25, 2021, Neptune Blog.

Park, Jae-wan, et al. "Improvement of the KCF Tracking Algorithm through Object Detection." International Journal of Engineering & Technology, vol. 7, No. 4.4, 2018, pp. 11-12., doi:www.sciencepubco.com/index.php/IJET.

Aperture F-Stop "Digital photography and Nikon DSLR camras. More focused." www.digital-photography.com, Schneider IT & Medien UG, 2021.

Mihajlovic, Ilija, "Everything You Ever Wanted to Know About Computer Vision" Apr. 25, 2019, http://www.towardsdatascience.com.

Burrows, T.D; "Television Production: Disciplines and Techniques." McGraw-Hill Higher Education. Figure 6-15, (1991) 5th Edition, ISBN-139780697129178.

Nikon Imaging Products DSLR Camera Basics Focal Length and Angle of view, 2021 Nikon Corporation; accessed Apr. 14, 2021.

* cited by examiner

REGION OF INTEREST BASED ADJUSTMENT OF CAMERA PARAMETERS IN A TELECONFERENCING ENVIRONMENT

CROSS-REFERENCE TO RELATED APPLICATION

This disclosure is related to U.S. application Ser. No. 16/773,282, filed Jan. 27, 2020, entitled DETECTING AND FRAMING TRACKING A SUBJECT OF INTEREST IN A TELECONFERENCE, the contents of which are entirely incorporated by reference herein.

TECHNICAL FIELD

This disclosure relates generally to videoconferencing and relates particularly to systems and methods to guide camera control parameters using one or more deep neural networks.

BACKGROUND

During a videoconference, people at a videoconferencing endpoint interact with people at one or more other videoconferencing endpoints. Camera image capture control parameters such as auto focus, auto white balance, auto exposure and color balancing have significant impact on the image quality. This is especially the case when artificial lighting is used—as it often is—during a typical video conferencing setup. Determining the best values for image control parameters to get best quality is very challenging and conventionally involves manual efforts for image tuning. The "auto" mode of a camera sub system for adjusting the control parameters may not always yield best results and may ignore the subjects (people and other objects of interests) completely. This can result in poor experience in a video conference. Thus, there is room for improvement in the art.

SUMMARY

To improve the video conferencing experience, this disclosure describes systems, methods, and devices for adjusting the camera image control parameters (based on deep learning, for example) and prioritizing subjects of interest in a conference.

An example of this disclosure includes a teleconferencing system, comprising: a camera, wherein the camera is configured to capture an image data stream comprising one or more image data frames in accordance with one or more image-capture parameters; and a processor coupled to the camera, wherein the processor is configured to: receive the image data stream from the camera; determine a region of interest within an image data frame of the image data stream; identify a sub-portion of the image data frame corresponding to the region of interest; evaluate a quality of image data corresponding to the sub-portion; determine that the quality of the image data corresponding to the sub-portion is below one or more predetermined quality thresholds; update one or more of the image-capture parameters of the camera, responsive to determining that the quality of the image data corresponding to the sub-portion is below the one or more predetermined quality thresholds.

Another example of this disclosure is a non-transitory computer readable medium storing instructions executable by a processor, wherein the instructions comprise instructions to: receive an image data stream from a camera, the image data stream comprising one or more image data frames captured by the camera in accordance with one or more image-capture parameters; determine a region of interest within an image data frame of the image data stream; identify a sub-portion of the image data frame corresponding to the region of interest; evaluate a quality of image data corresponding to the sub-portion; determine that the quality of the image data corresponding to the sub-portion is below one or more predetermined quality thresholds; and update one or more of the image-capture parameters of the camera, responsive to determining that the quality of the image data corresponding to the sub-portion is below the one or more predetermined quality thresholds.

Another example of this disclosure includes method of optimizing capture and depiction of a region of interest at a teleconferencing endpoint, comprising: capturing an image data stream using a camera, the image data stream comprising one or more image data frames captured by the camera in accordance with one or more image-capture parameters; receiving the image data stream from the camera at a processor; determining, using the processor, a region of interest within an image data frame of the image data stream; identifying, using the processor, a sub-portion of the image data frame corresponding to the region of interest; evaluating, using the processor, a quality of image data corresponding to the sub-portion; determining, using the processor, that the quality of the image data corresponding to the sub-portion is below one or more predetermined quality thresholds; adjusting, using the processor, one or more of the image-capture parameters of the camera, responsive to determining that the quality of the image data corresponding to the sub-portion is below the one or more predetermined quality thresholds.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
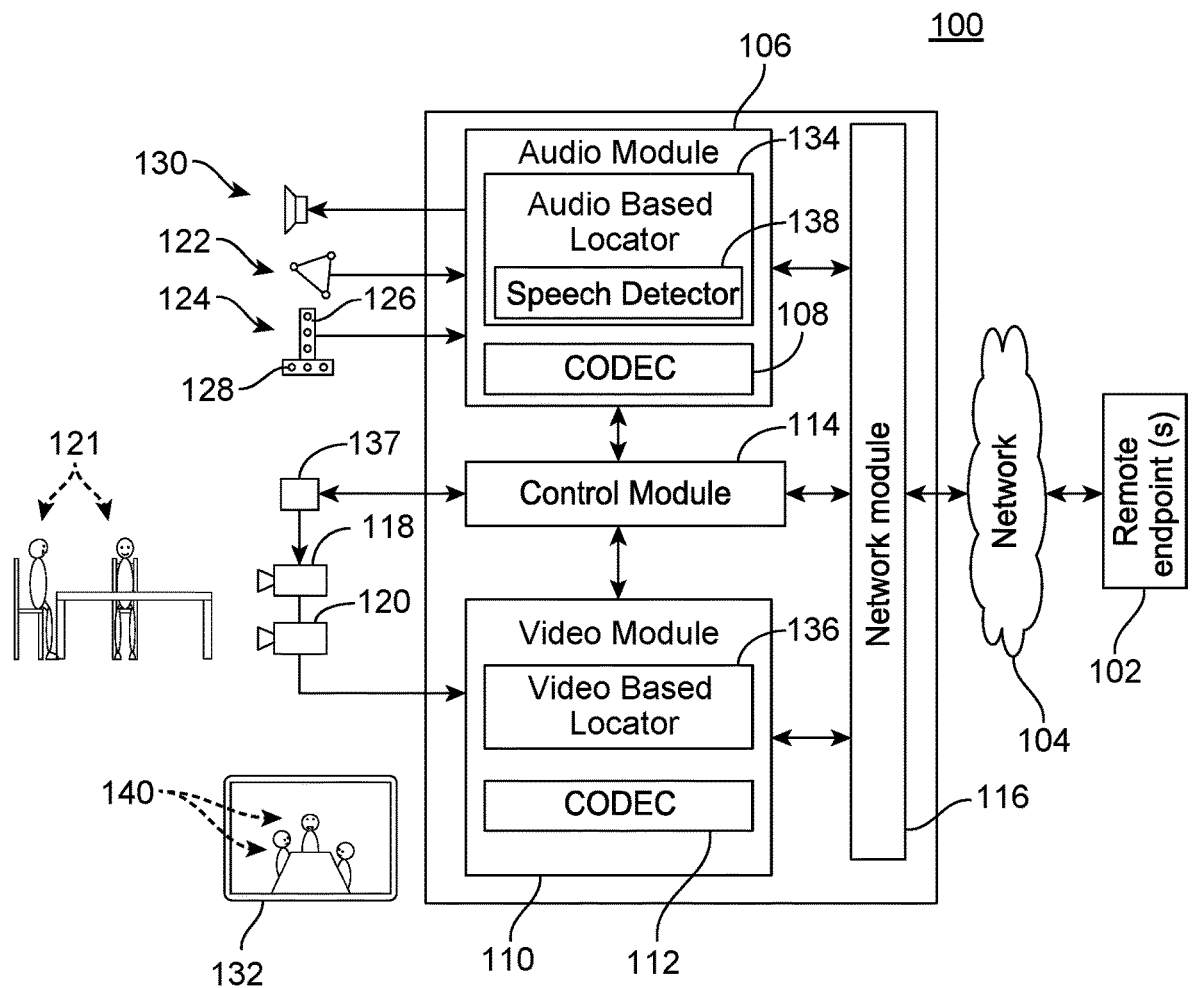
FIG. 1 illustrates a videoconferencing endpoint, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

INTRODUCTION

Throughout this disclosure, terms are used in a manner consistent with their use by those of skill in the art, for example:

A centroid or geometric center of a plane figure is the arithmetic mean position of all the points in the figure.

A normal is an object such as a line or vector that is perpendicular to a given object. In two dimensions, the normal line to a curve at a given point is the line perpendicular to the tangent line to the curve at the point. In three dimensions, a normal to a surface at a point is a vector perpendicular to the tangent plane of the surface at that point.

The term video frame can include a still image captured by a camera as part of a video stream.

DISCUSSION

In one or more examples of this disclosure, a subject of interest is determined based on multiple factors. In at least one example of this disclosure, a videoconferencing device can detect and focus on an active talker. One or more microphone arrays can be used to determine the direction from the videoconferencing device to the active talker. In one or more examples of this disclosure, one or more cameras are used to locate the face of an active talker. In some examples, sound source localization is used to detect an active talker. In some examples, body detection is used to detect an active talker. In some examples, lip motion detection is used to locate the current speaker. In at least one example, when the current speaker is located, one or more cameras can be automatically directed toward him or her. A view of the active talker can be captured for transmission to another endpoint and the active talker can be tracked during a videoconference.

In some examples of this disclosure, other bases for selecting one or more views (or portions of views) for rendering are utilized. In at least one example, a diagram at an endpoint will be the subject of interest when a speaker refers to the diagram. In at least one example, a meeting participant at an endpoint with a speaker will be the subject of interest when the speaker addresses that participant. In at least one example, an object will be the subject of interest when the speaker makes hand gestures directed towards the object. In at least one example, a meeting participant at an endpoint with a speaker will be the subject of interest when the speaker discusses that meeting participant in the third person. In accordance with examples of this disclosure, one or more views depicting the subject of interest will be transmitted to a remote endpoint for viewing.

Aspects of this disclosure pertain to optimizing how a subject of interest is framed. At least one example of this disclosure is directed to determining where to locate a subject of interest within a frame. In at least one example, when the subject of interest is a person who has at least one eye in a capturing camera's field of view, the degree to which that person's is placed away from the centroid of a rendered frame is a function of the degree to which that person is looking away from the capturing camera.

Aspects of this disclosure pertain to adjusting camera settings to optimize how the subject of interest within a frame is depicted within subsequent frames.

In at least one example of this disclosure, an object or person will be a subject of interest when most participants at an endpoint look at that object or person. In at least one example of this disclosure, an object or person will be a subject of interest when a plurality of participants at an endpoint looks at that object or person.

In at least one example of this disclosure, head pose estimation is used as a cue to find the object or person at which participants are looking. In at least one example, eye gaze estimation is used as a cue to find the object or person at which participants are looking. In at least one example of this disclosure, head pose estimation and eye gaze estimation are used as cues to find the object or person at which participants are looking. In at least one example, a voting module takes head pose and eye gaze estimation data and finds the "hot areas" that are currently grabbing people's attention. In some examples, an object detection module determines whether there are objects about the "hot areas." Objects may be people or things, such as, whiteboards, screens, flipcharts, or products.

In at least one example of this disclosure, a decision will be to present a view containing the subject of interest. Presenting the view can include switching from an earlier view. Switching the view can include switching between cameras, panning or zooming (mechanically or electronically) one of the cameras, switching to a content stream, switching to the output of a smart board, and switching to a dedicated white board camera.

In at least one example of this disclosure, a focus estimation model is used to determine where people are looking in a frame or series of frames. In this example, focus estimation is performed by a neural network trained to take an input image and output a focus map. The focus map is a probability distribution indicating how likely it is that people at a particular location care about a particular area.

In at least one example of this disclosure, a focus target estimation model is used to determine subjects of interest so that those subjects can be properly framed within images of a data stream. In this example, focus target estimation is performed by a neural network trained to take an input image and output an audio-visual map.

Technical benefits of determining areas of interest within meeting spaces include helping to determine what kind of meeting space makes meetings more efficient, determining how to reduce distractions, and how to select portions of a frame for rendering.

Technical benefits of automatically adjusting camera control settings (e.g., focus length, exposure) based on image quality for a region of interest (a sub-portion of a frame), rather than the entire frame containing the region of interest, include improved rendering of the subject(s) within the region for persons viewing at a remote endpoint.

In at least one method of this disclosure, multiple frames in a stream are individually scored. The individual scores of the frames can be normalized using standard statistical methods. Outlier scores of individual frames can be rejected. The scores of the individual frames are averaged to acquire a comprehensive score for a video stream. Based on the comprehensive score, a determination may be made as to which way a person's head is pointing or which way a person is facing. When a person is an active talker that person's face may be present in the camera feed of more than one camera. In at least one example of this disclosure, a preferred feed is selected because in the preferred feed the active talker's face is more closely oriented toward the camera that captured the preferred feed.

FIG. 1 illustrates a videoconferencing endpoint 100 in accordance with an example of this disclosure. The videoconferencing apparatus or endpoint 100 communicates with one or more remote endpoints 102 over a network 104.

Components of the endpoint 100 include an audio module 106 with an audio codec 108 and has a video module 110 with a video codec 112. Modules 106, 110 operatively couple to a control module 114 and a network module 116. In one or more examples, endpoint 100 includes exactly one wide angle electronic-pan-tilt-zoom camera. In some examples, when a view subject is zoomed in upon, a sub-portion of the captured image containing the subject is rendered, whereas other portions of the image are not.

During a videoconference, one or more cameras (e.g., camera 118 and camera 120) capture video and provide the captured video to the video module 110 and codec 112 for processing. In at least one example of this disclosure, one camera (e.g., 118) is a smart camera and one camera (e.g., 120) is not a smart camera. In some examples, two or more cameras (e.g., camera 118 and camera 120) are cascaded such that one camera controls some or all operations of the other camera. In some examples, two or more cameras (e.g., camera 118 and camera 120) are cascaded such that data captured by one camera is used (e.g., by control module 114) to control some or all operations of the other camera. Additionally, one or more microphones 122 capture audio and provide the audio to the audio module 106 and codec 108 for processing. These microphones 122 can be table or ceiling microphones, or they can be part of a microphone pod or the like. In one or more examples, the microphones 122 are tightly coupled with one or more cameras (e.g., camera 118 and camera 120). The endpoint 100 uses the audio captured with these microphones 122 primarily for the conference audio.

Endpoint 100 also includes microphone array 124, in which subarray 126 is orthogonally arranged with subarray 128. Microphone array 124 also captures audio and provides the audio to the audio module 106 for processing. In some examples, microphone array 124 includes both vertically and horizontally arranged microphones for determining locations of audio sources, e.g., people who are speaking. In some examples, the endpoint 100 uses audio from the array 124 primarily for camera tracking purposes and not for conference audio. In some examples, endpoint 100 uses audio from the array 124 for both camera tracking and conference audio.

After capturing audio and video, the endpoint 100 encodes the audio and video in accordance with an encoding standard, such as MPEG-1, MPEG-2, MPEG-4, H.261, H.263 and H.264. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 100 also includes a loudspeaker 130 which outputs conference audio, and a display 132 outputs conference video.

In at least one example of this disclosure, the endpoint 100 uses the two or more cameras 118, 120 in an automated and coordinated manner to handle video and views of the videoconference environment dynamically. In some examples, a first camera (e.g., 118) is a fixed or room-view camera, and a second camera 120 is a controlled or people-view camera. Using the room-view camera (e.g., 118), the endpoint 100 captures video of the room or at least a wide or zoomed-out view of the room that would typically include all the videoconference participants 121 as well as some of their surroundings.

According to some examples, the endpoint 100 uses the people-view camera (e.g., 120) to capture video of one or more participants, including one or more current talkers, in a tight or zoomed-in view. In at least one example, the people-view camera (e.g., 120) can pan, tilt and/or zoom.

In one arrangement, the people-view camera (e.g., 120) is a steerable pan-tilt-zoom (PTZ) camera, while the room-view camera (e.g., 118) is an electronic pan-tilt-zoom (EPTZ) camera. As such, the people-view camera (e.g., 120) can be steered, while the room-view camera (e.g., 118) cannot. In at least one example, both camera 118 and camera 120 are EPTZ cameras. In at least one example, camera 118 is associated with a sound source locator module 134. In fact, both cameras 118, 120 can be steerable PTZ cameras.

In some examples, the endpoint 100 will alternate between tight views of a speaker and wide views of a room. In some examples, the endpoint 100 alternates between two different tight views of the same or different speaker. In some examples, the endpoint 100 will capture a first view of a person with one camera and a second view of the same person with another camera and determine which view is better for sharing with a remote endpoint 102.

In at least one example of this disclosure, the endpoint 100 outputs video from only one of the two cameras 118, 120 at any given time. As the videoconference proceeds, the output video from the endpoint 100 can switch from the view of one camera to another. In accordance with some examples, the system 100 outputs a room-view when there is no participant speaking a people-view when one or more participants 121 are speaking.

In accordance with an example, the endpoint 100 can transmit video from both cameras 118, 120 simultaneously, and the endpoint 100 can let the remote endpoint 102 decide which view to display or determine that one view will be displayed relative the other view in a specific manner. For example, one view can be composited as a picture-in-picture of the other view.

In one or more examples, the endpoint 100 uses audio-based locator 134 and a video-based locator 136 to determine locations of participants 121 and frame views of the environment and participants 121. The control module 114 uses audio and/or video information from these locators 134, 136 to crop one or more captured views, such that one or more subsections of a captured view will be displayed on a display 132 and/or transmitted to a remote endpoint 102. In some examples, commands to one or both cameras 118, 120 are implemented by an actuator or local control unit 137 having motors, servos, and the like to steer one or both cameras 118, 120 mechanically. In some examples, such camera commands can be implemented as electronic signals by one or both cameras 118, 120. In some examples, camera commands adjust the aperture of the camera. In some examples, camera commands adjust the focus of the camera.

In some examples, to determine which camera's view to use and how to configure a view, the control module 114 uses audio information obtained from the audio-based locator 134 and/or video information obtained from the video-based locator 136. For example, the control module 114 uses audio information processed by the audio-based locator 134 from the horizontally and vertically arranged microphone subarrays 126, 128. The audio-based locator 134 uses a speech detector 138 to detect speech in captured audio from subarrays 126, 128 to determine a location of a current participant. The control module 114 uses the determined location to steer the people-view camera toward that location. In some examples, the control module 114 uses video information captured using the cameras 118, 120 and processed by the video-based locator 136 to determine the locations of participants 121, to determine the framing for the views, and to steer the one or more of the cameras (e.g., 118, 120). In other examples, none of the cameras is physically steerable.

A wide view from one camera (e.g., 118) can give context to a zoomed view from another camera (e.g., 120) so that participants 121 at the far-end 102 see video from one camera (e.g., 118) as the video from the other camera (e.g., 120) is being adjusted. In some examples, transitions between the two views from the cameras 118, 120 can be faded and blended to avoid sharp cut-a-ways when switching between camera views. In some examples, a switch from a first view to a second view for transmission to a remote endpoint 102 will not occur until an active participant 121 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 121 at an endpoint 100, the cultural niceties of the participants 140 at the remote endpoint 102, and the sizes of one or more displays 132 displaying captured views.

Figure 2A:
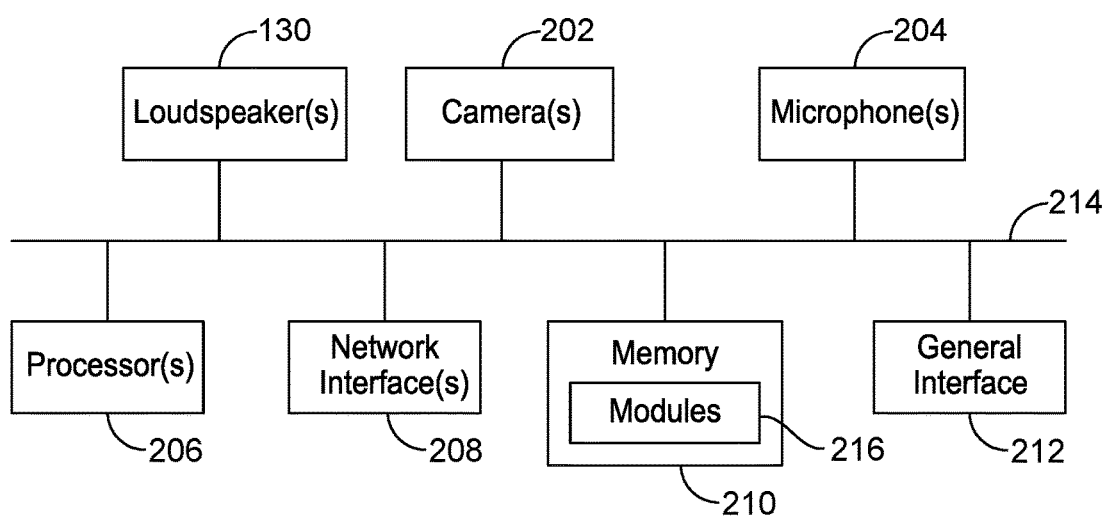
FIG. 2A illustrates aspects of the videoconferencing endpoint of FIG. 1.

FIG. 2A illustrates aspects of videoconferencing endpoint 200 (e.g., 100), in accordance with an example of this disclosure. The endpoint 200 includes a loudspeaker 130, camera(s) 202 (e.g., 118, 120) and microphones 204 (e.g., 122, 124). The endpoint 200 also includes a processing unit 206, a network interface 208, a memory 210 and an input/output interface 212, all coupled by bus 214.

The memory 210 can be any conventional memory such as SDRAM and can store modules 216 in the form of software and firmware for controlling the endpoint 200. In addition to audio and video codecs (108, 112) and other modules discussed previously, the modules 216 can include operating systems, a graphical user interface (GUI) that enables users to control the endpoint 200, and algorithms for processing audio/video signals and controlling the camera(s) 202. In at least one example of this disclosure, one or more camera(s) 202 can be a panoramic camera.

The network interface 208 enables communications between the endpoint 200 and remote endpoints (102). In one or more examples, the interface 212 provides data transmission with local devices such as a keyboard, mouse, printer, overhead projector, display, external loudspeakers, additional cameras, and microphone pods, etc.

The camera(s) 202 and the microphone(s) 204 capture video and audio, respectively, in the videoconference environment and produce video and audio signals transmitted through the bus 214 to the processing unit 206. In at least one example of this disclosure, the processing unit 206 processes the video and audio using algorithms in the modules 216. For example, the endpoint 200 processes the audio captured by the microphones 204 as well as the video captured by the camera(s) 202 to determine the location of participants 121 and control and select from the views of the camera(s) 202. Processed audio and video can be sent to remote devices coupled to network interface 208 and devices coupled to general interface 212.

Figure 2B:
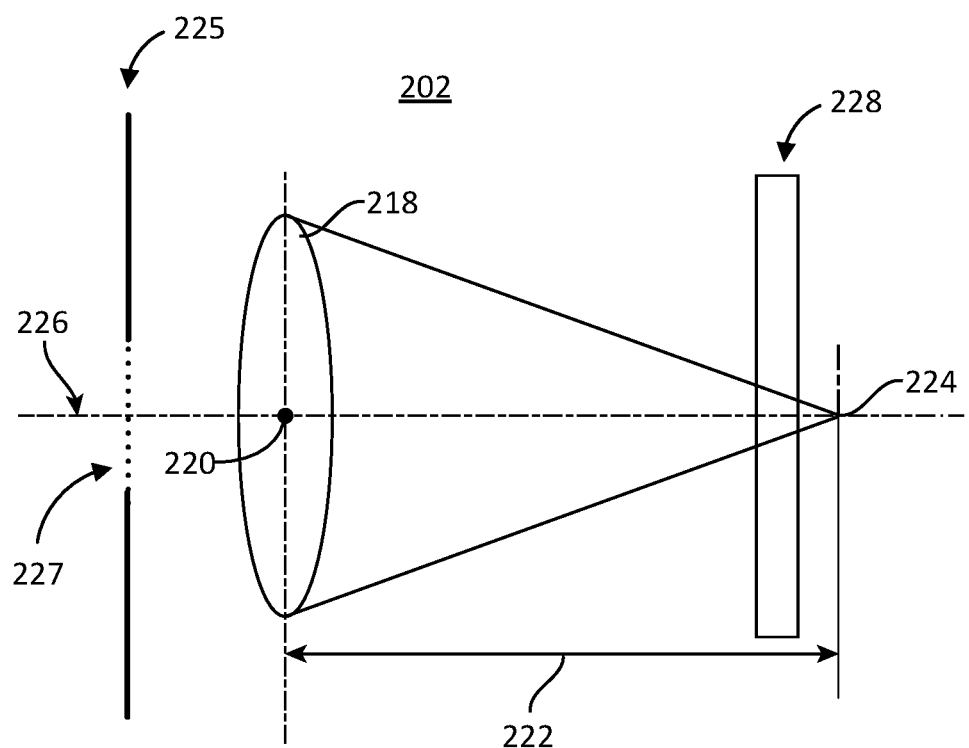
FIG. 2B illustrates aspects of a camera, in accordance with an example of this disclosure.

FIG. 2B illustrates aspects of a camera 202, in accordance with an example of this disclosure. The camera 202 has a lens 218. The lens 218 has a central region or centroid 220, and a focal length 222 between the centroid 220 of the lens 218 and a focal point 224 of the lens 218. The focal length 222 lies along the lens's focal line 226, which is normal (perpendicular) to the lens 218. The camera 202 includes a shutter 225, which when opened forms an aperture 227. The wider the shutter 225 is opened, the larger the aperture 227 becomes, and the more light is able to reach the camera's light sensor 228. In some examples, the distance between the lens 218 and the light sensor 228 can be adjusted to move the focal point 224 with respect to the sensor 228. In some examples, the focus of the camera 202 can be adjusted by moving the camera 202 away from or towards a region of interest. As will be understood by those of skill within the photographic arts, both of such adjustments can be construed as affecting the (effective) focal length (or focus length) of the camera 202.

FIGS. 3A-E illustrate receiving and evaluating a frame of image data, in accordance with an example of this disclosure. Other methods of evaluating a frame of image data are contemplated within this disclosure.

Figure 3A:
FIGS. 3A-E illustrate receiving and evaluating a frame of image data, in accordance with an example of this disclosure.

FIG. 3A illustrates a frame 300 of image data, captured by a camera 202 in accordance with an example of this disclosure. The frame 300 contains a view of a meeting room with several meeting participants 121.

Figure 3B:
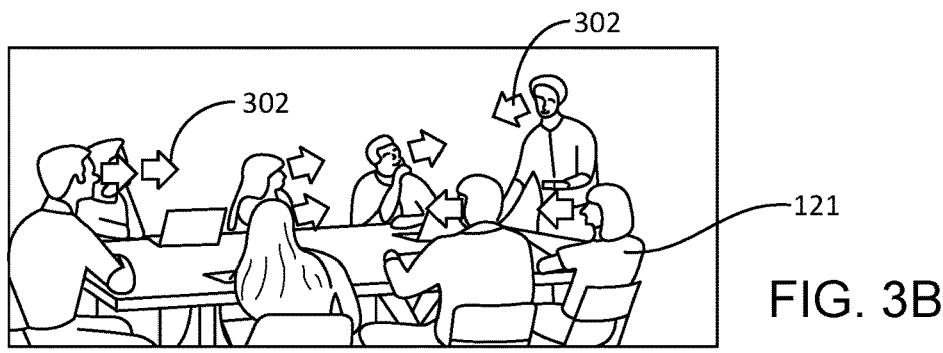

FIG. 3B illustrates that the directions 302 which the participants 121 are looking are evaluated. In at least one example, such evaluation is based on estimating the head poses of the participants 121. In at least one example, such evaluation is based on estimating the eye gaze of the participants 121.

Figure 3C:
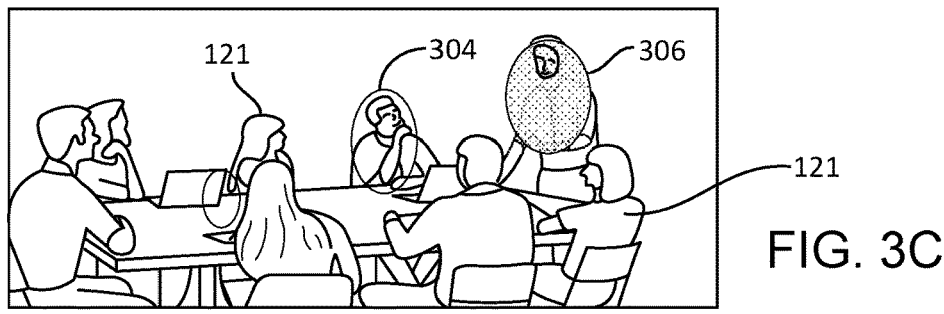

FIG. 3C illustrates that, based on the directional information garnered with respect to FIG. 3B, some of the participants 121 are looking at a first "hot area" 304 and some of the participants 121 are looking at a second "hot area" 306.

Figure 3D:
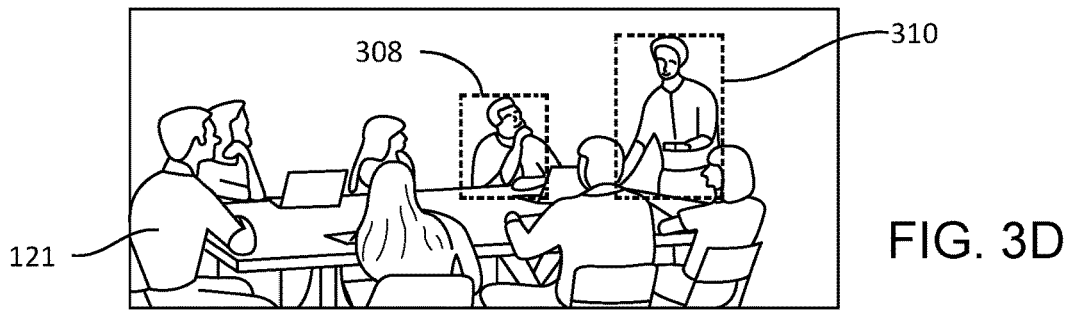

FIG. 3D illustrates that once the hot areas 304, 306 are identified, a determination is then made as to whether the hot areas 304, 306 contain objects. In FIG. 3D, it can be seen that hot area 304 contains a first meeting participant and hot area 306 contains a second meeting participant. The first meeting participant is depicted in sub-portion 308 of the frame, and the second meeting participant is within sub-portion 310. A frame (e.g., 300) can contain one or more sub-portions; sub-portions can overlap; and a sub-portion can envelope one or more sub-portions. It is worth noting that while a determination as to whether any of the participants 121 is currently speaking can be used when evaluating who (or what) is the current focus of interest, examples of this disclosure do not require determining who is an active talker.

Figure 3E:
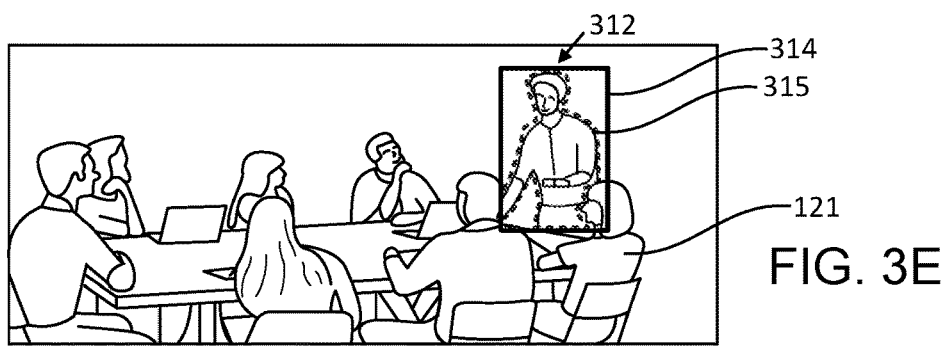

FIG. 3E illustrates once it has been confirmed that the hot areas correspond to objects, a final determination is then made concerning which object (e.g., person) is the subject of interest 312. The subject of interest 312 can be bounded within a (polygonal) bounded region 314 of the frame 300. Alternately or additionally, the subject of interest 312 can be bounded within a bounded region 315 of the frame 300 hewn more closely to the outline (e.g., perimeter) of the subject of interest 312. Various suitable techniques for accurately determining bounded region 315 are available in the literature. See e.g., Derrick Mwiti, "Image Segmentation in 2021: Architectures, Losses, Datasets, and Frameworks," https://neptune.ai/blog/image-segmentation-in-2020, which is incorporated by reference herein. The image data within the bounded region 314, 315 can be rendered, such as by transmitting the image data to other meeting participants 140 at a remote endpoint 102. The image quality of the image data within the bounded region 314, 315 can be evaluated to the exclusion of the data from outside the boundary, such as by determining the contrast within that region 314, 315. If the image quality within the bounded region 314, 315 is insufficient, the shutter speed or other camera control parameters can be adjusted so that the quality within the bounded region 314, 315 of subsequent frames will be improved, regardless of how they might affect the areas of the frames which are not included for rendering.

Figure 4A:
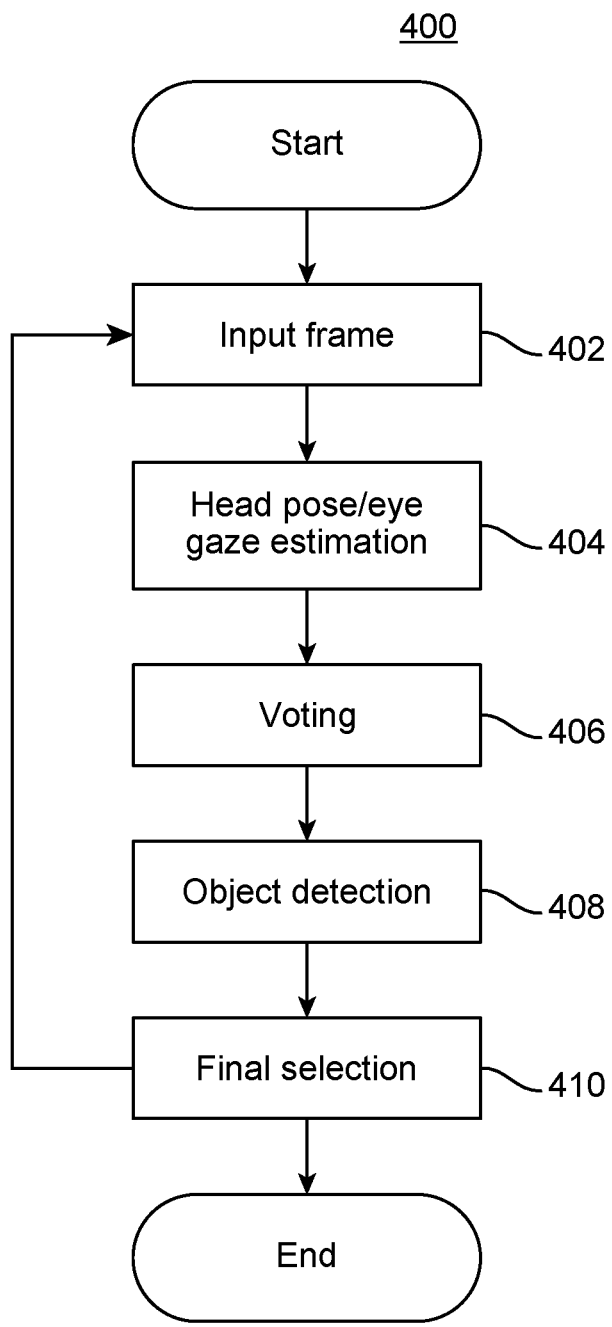
FIG. 4A illustrates a method of determining a subject of interest, in accordance with an example of this disclosure.

FIG. 4A illustrates a method 401 of determining a subject of interest, in accordance with an example of this disclosure. At step 402 an input frame (e.g., 300) is received, such as from a camera 202. At step 404, head pose estimation and eye gaze estimation are used as cues to find the object or person participants are looking at. At step 406, a voting module then takes the estimation data and finds the "hot areas" that are grabbing people's attention. Thereafter, an object detection module determines 408 if there are objects in or near the "hot areas". As noted, objects may be people (such as divined through facial detection operations), whiteboards, screens, flipcharts, posters, and the like. Thereafter, in step 410, a final decision is made (alone, or in concert with other information) and a view containing the subject of interest 312 is rendered. The method 400 may end or return to step 402 in which another frame of image data is received. The image quality of the view containing the subject of interest can be evaluated and used to update camera control parameters as more frames of image data are captured and received.

Figure 4B:
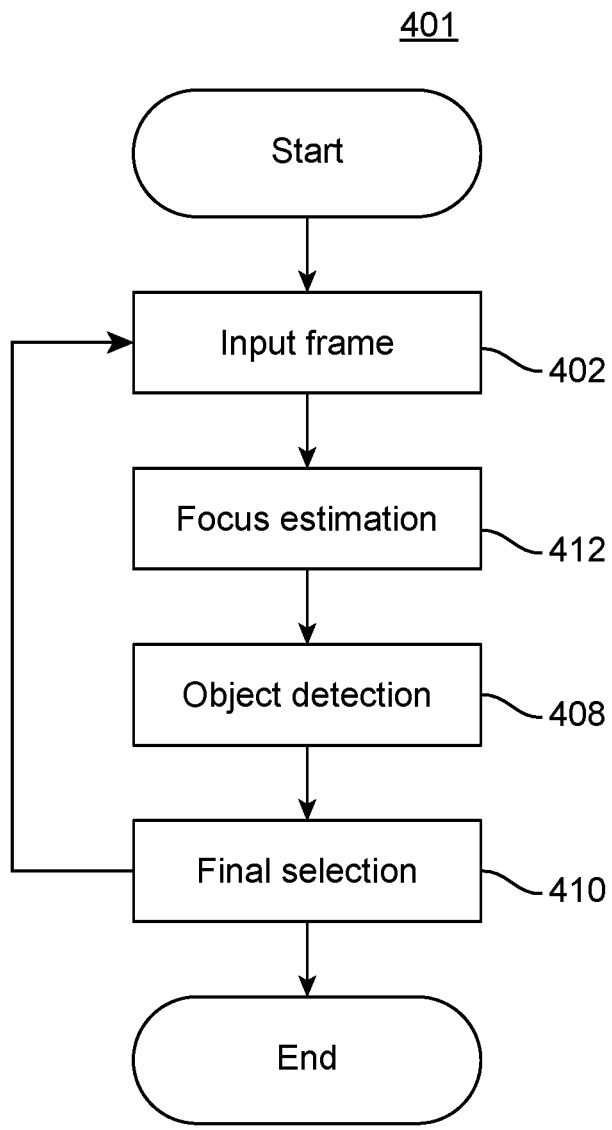
FIG. 4B illustrates another method of determining a subject of interest, in accordance with an example of this disclosure.

FIG. 4B illustrates another method 401 of finding a subject of interest, in accordance with an example of this disclosure. At step 402 an input frame (e.g., 300) is received, such as from a camera 202. At step 412, a focus estimation model is used to evaluate 412 where participants' attention is focused. Focus estimation 412 is performed using a neural network trained to take an input image (e.g., 300) and output a focus map (not shown). A focus map contains a probability distribution indicating how likely it is that people (e.g., 121) at an endpoint 100 are focusing their attention on a given area. After step 412 is complete, an object detection module determines 408 if there are objects in and/or near the "hot areas". As noted, objects may be people (such as divined through facial detection operations), whiteboards, screens, flipcharts, posters, and the like. Thereafter, in step 410, the subject of interest is finally determined (alone, or in concert with other information) and a view containing the subject of interest 312 is rendered. The image quality of the view containing the subject of interest 312 can be evaluated and used to update camera control parameters as more frames of image data are captured and received. The method 401 may end or return to step 402 in which another frame of image data is received.

Figure 5:
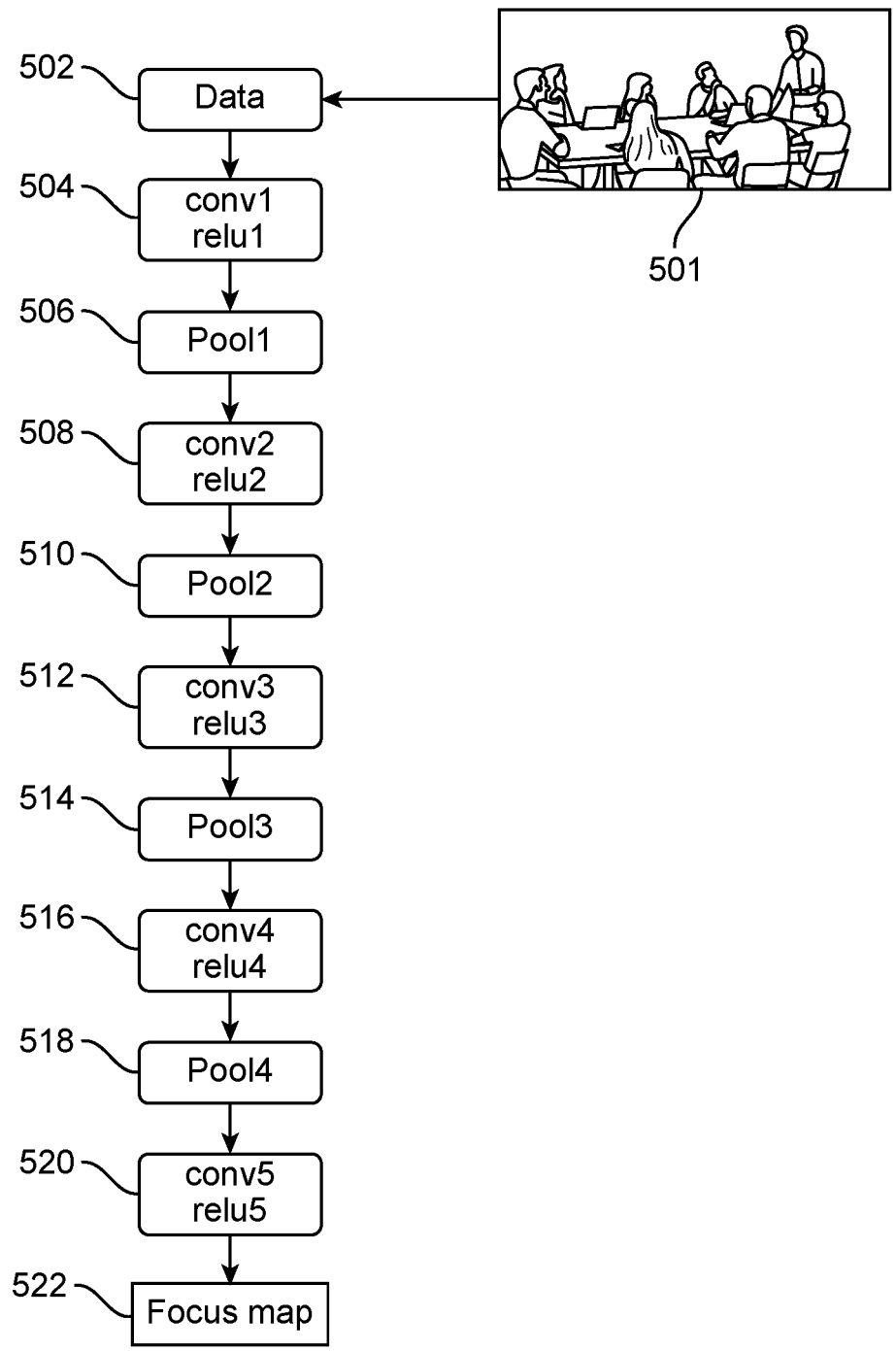
FIG. 5 illustrates a focus estimation model, in accordance with an example of this disclosure.

FIG. 5 illustrates a region of interest estimation model 500 of a deep learning artificial neural network, in accordance with examples of this disclosure. As described with respect to FIG. 4B, a view frame 501 (e.g., 300) is captured by a camera 202. The image data 502 corresponding to a frame of the view passes to a first convolutional layer 504 and a first rectified linear activation function is applied. The rectified output of the first convolutional layer then passes to a first pooling layer 506. The output of the first pooling layer 506 then passes to a second convolutional layer 508 and a second rectified linear activation function is applied. The rectified output of the second convolutional layer then passes to a second pooling layer 510. The output of the second pooling layer 510 then passes to a third convolutional layer 512 and a third rectified linear activation function is applied. The rectified output of the third convolutional layer 512 then passes to a third pooling layer 514. The output of the third pooling layer 514 then passes to a fourth convolutional layer 516 and a fourth rectified linear activation function is applied. The rectified output of the fourth convolutional layer 516 then passes to a fourth pooling layer 518. The output of the fourth pooling layer 518 then passes to a fifth convolutional layer 520 and a fifth rectified linear activation function is applied. The rectified output of the fifth convolutional layer 520 contains a focus map 522. The focus map (audio-visual map) 522 is used to identify the subject of interest (e.g., 312) in the manner discussed above.

Figure 6A:
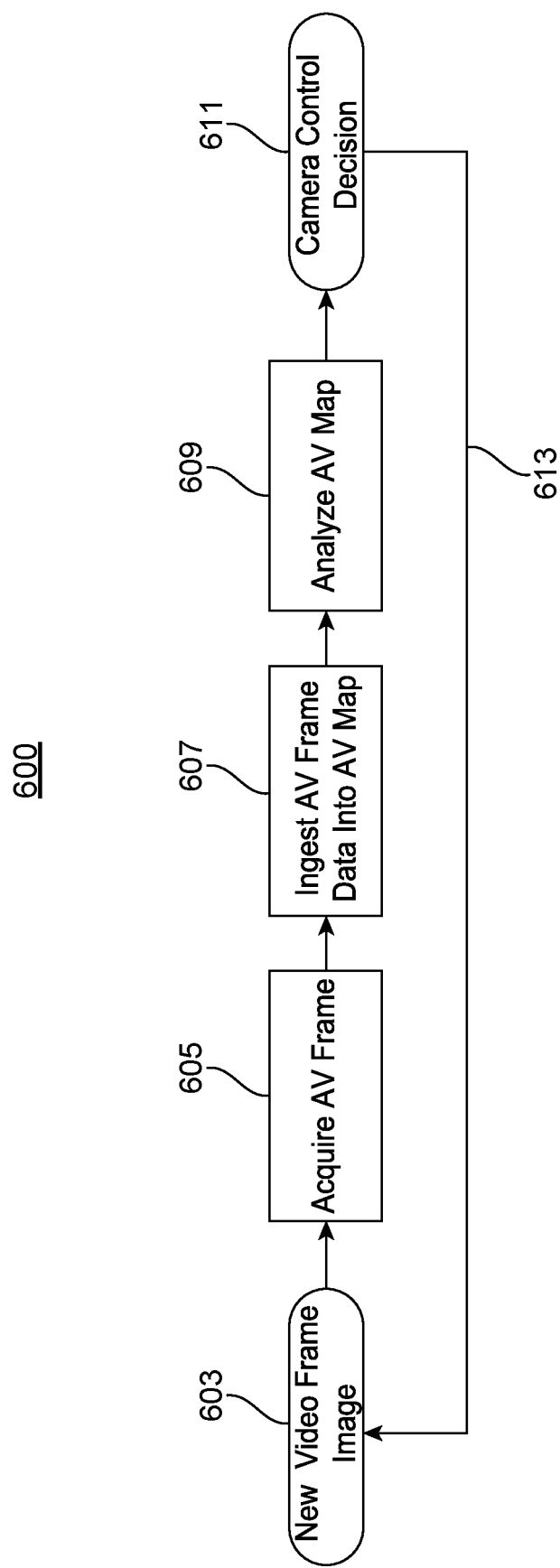
FIG. 6A illustrates a method of adjusting camera settings based on image quality within a region of interest, in accordance with an example of this disclosure.

FIG. 6A illustrates a method 600 for building contextual data for an audio-visual map (522), in accordance with an example of this disclosure. The method 600 of building data contained in an audio-visual map is an iterative process 613 in which framing affects camera control decisions and camera decisions affect further framing. The duration of process 613 is not fixed. The length of time to perform the method 600 depend on factors such as the speed of the processor(s) executing the process 613, the rapidity with which equipment can capture data, and the complexity of data so captured. In at least one example of this disclosure, the duration of time for the process 613 corresponds to a video frame rate (VFR). The VFR is an amount of time required to acquire, process, and analyze one frame of audio-visual data.

In some examples, the VFR is actively tracked by the system (e.g., 100, 200) so that the system can adjust internal values and calculations accordingly. In at least one example of this disclosure, the VFR is four hundred milliseconds. In some examples, the VFR is three seconds. The method 600 begins with the capture 603 of a still image (of a stream of images). An audio-visual frame is acquired 605 which contains both audio-visual data corresponding to the instant in time during which the still image was captured 603. This data of the audio-visual frame is ingested 607 into an audio-visual map. The AV map is analyzed 609, and one or more camera control decisions are made 611 based on the analysis 609, such as whether to change the aperture size of the camera 202 or whether to adjust the camera's focus.

In some examples of this disclosure, once the audio-visual frame has been ingested, the entire audio-visual map can be evaluated to determine the desired control functionality. The data can be read into a simple logic algorithm or taken as input to a Neural Network or Deep Learning algorithm to achieve a variety of different experiences such as: Speaker Framing, in which a single talker is framed; Group Framing, in which images of all participants in a camera's field of view are included in a data stream; Conversation Tracking, in which participants involved in a conversation are shown in a wide-angle view or a split-screen view; Subject Framing, in which a target that most participants appear to be looking towards is framed; and Presenter Tracking, in which a specific target is selected to be followed and included in a data stream.

Figure 6B:
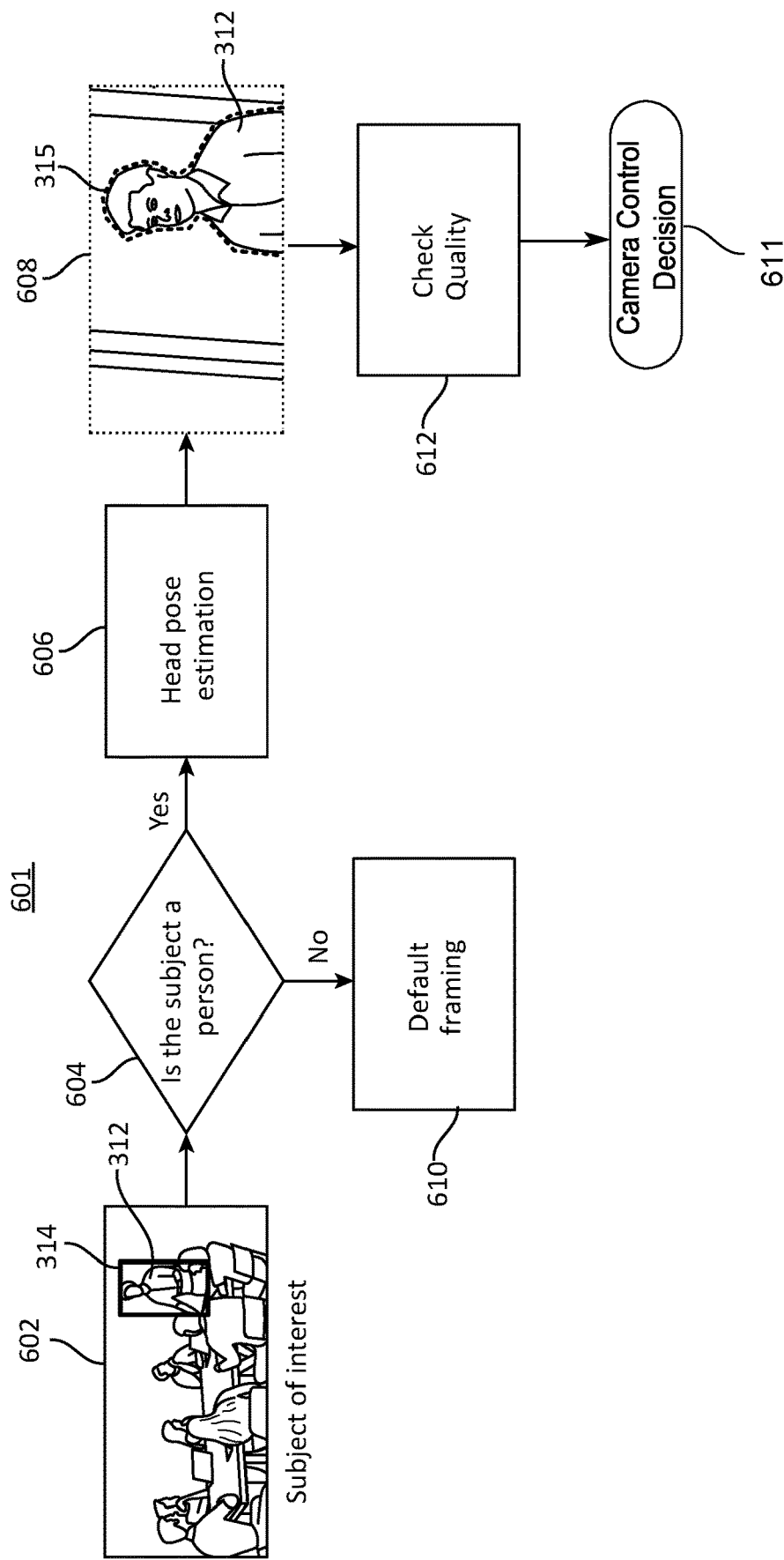
FIG. 6B illustrates another method of adjusting camera settings based on image quality within a region of interest, in accordance with an example of this disclosure.

FIG. 6B illustrates a method 601 of framing a subject of interest 312. The method 601 begins by identifying (locating) 602 a subject of interest 312 within a frame of image data, such as by method 400 and/or method 401. The subject of interest 312 is initially framed within a default frame (bounded area) 314. A determination 604 is then made as to whether the subject of interest 312 is a person. If the subject of interest 312 is a person, the method 601 proceeds to estimate 606 the orientation of the person's head (or face). A portion (e.g., 315) of the original frame of image data containing the subject of interest 312 is then selected 608 for rendering, such as by sending the image data to a remote endpoint 102. According to the method 601, selection 608 of the portion of the frame is done so as to place the subject of interest 312 within the shared view in a manner that is pleasing to a meeting participant looking at the view on a display device (e.g., 132). If, on the other hand, it is determined that the subject of interest 312 is not a person, then a default frame in which the subject of interest is substantially centered in the view will be used 610. In either case, once the frame of image data containing the subject of interest 312 is selected 608 for rendering, the quality of image data within the frame (e.g., within portion 315) can be checked 612 and used to determine 611 whether one or more camera control parameters should be updated.

Figure 7:
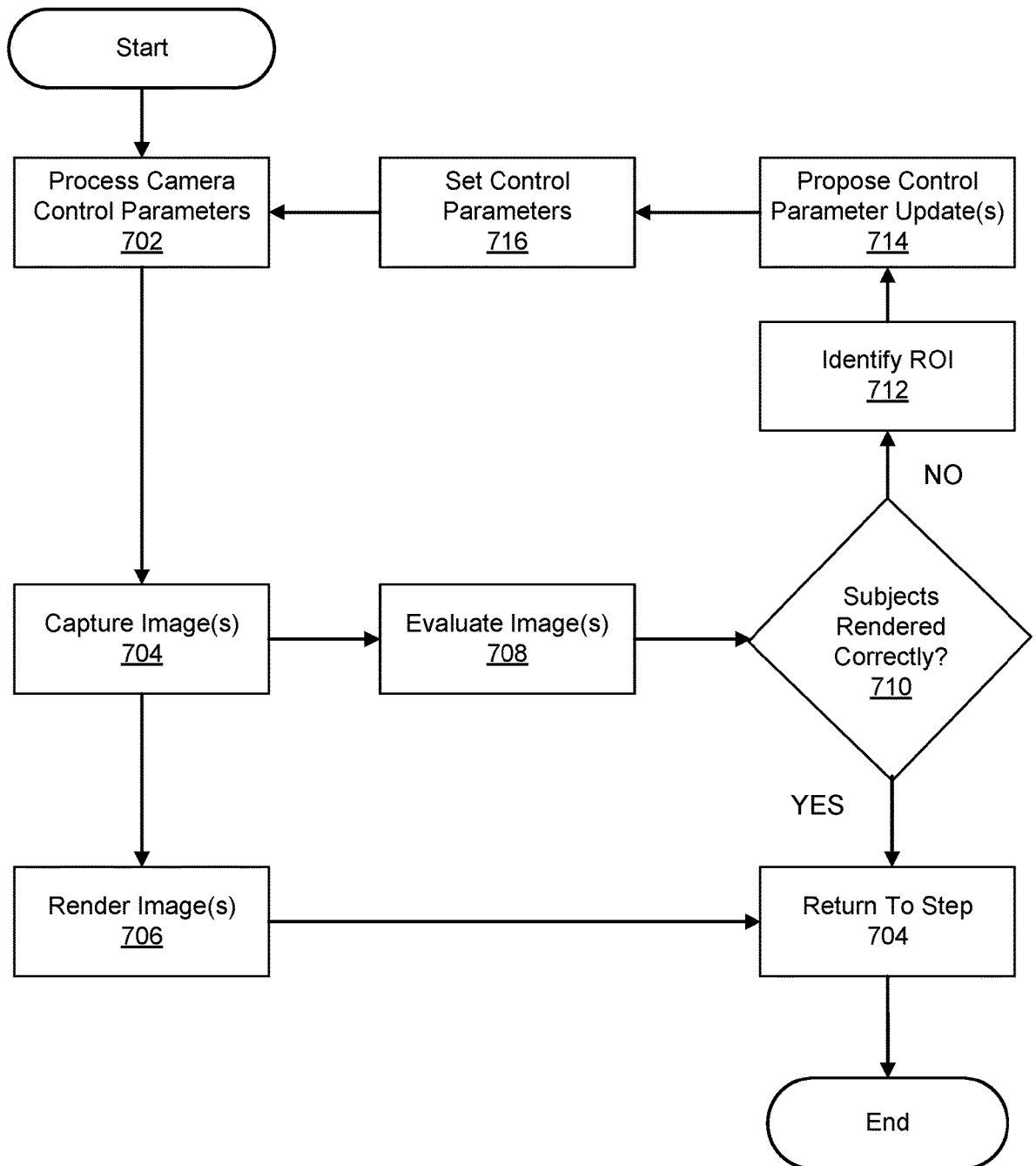
FIG. 7 illustrates aspects of a method of adjusting camera settings based on image quality within a region of interest, in accordance with an example of this disclosure.

FIG. 7 illustrates aspects of a method 700 of adjusting camera settings based on image quality within a region of interest, in accordance with an example of this disclosure. At the beginning of the method 700, camera control parameters are processed 702 and then frames of image data are captured 704 in accordance with the parameters. Images corresponding to some (but not necessarily all) captured data will be rendered 706. Periodically, the image data is evaluated 708 (for focus quality, contrast, etc.). If the system 100 (200) determines 710 that the subject(s) of interest are rendered correctly, the system 100 will continue capturing 704 the video feed using the current camera settings. If the system 100 determines 710 that the subject(s) of interest are not rendered correctly, the system 100 will identify 712 a region of interest (see e.g., FIG. 4B) and propose 714 updates to the camera control parameters (e.g., focus length). The system 100 will then update 716 the camera control parameters, and subsequent images will be captured 704 using the revised settings, and so on.

Figure 8:
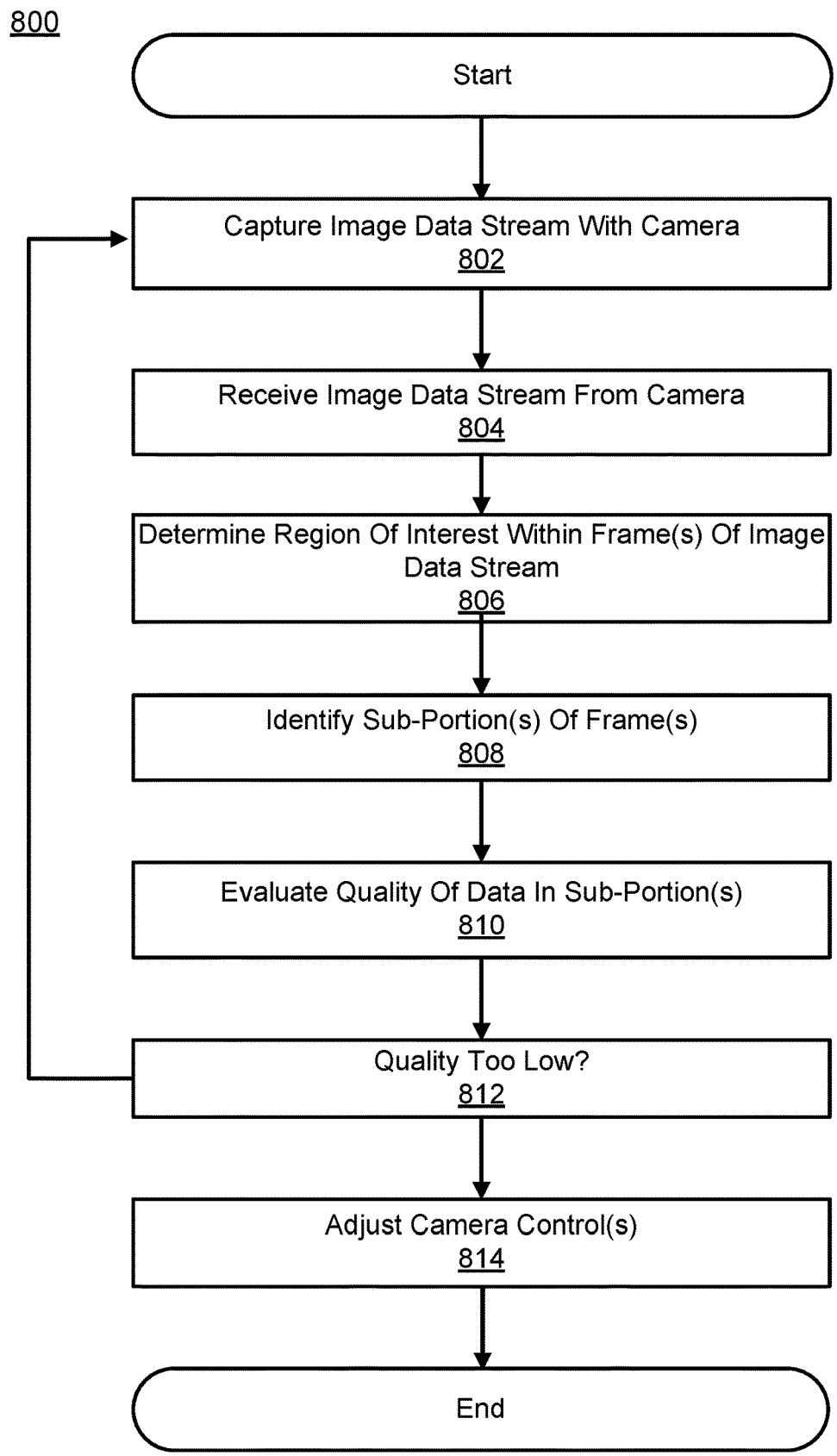
FIG. 8 illustrates aspects of another method of adjusting camera settings based on image quality within a region of interest, in accordance with an example of this disclosure.

FIG. 8 illustrates a method 800 of optimizing capture and depiction of a region of interest (304, 306) at a teleconferencing endpoint (100), comprising: capturing 802 an image data stream using a camera (202), the image data stream comprising one or more image data frames (300) captured by the camera (202) in accordance with one or more image-capture parameters; receiving 804 the image data stream from the camera (202) at a processor (206); determining 806, using the processor (206), a region of interest (304, 306) within an image data frame (300) of the image data stream; identifying 808, using the processor (206), a sub-portion (314, 315) of the image data frame (300) corresponding to the region of interest (304, 306); evaluating 810, using the processor (206), a quality of image data corresponding to the sub-portion (314, 315); determining 812, using the processor (206), that the quality of the image data corresponding to the sub-portion (314, 315) is below one or more predetermined quality thresholds; adjusting 814, using the processor (206), one or more of the image-capture parameters of the camera (202), responsive to determining that the quality of the image data corresponding to the sub-portion (314, 315) is below the one or more predetermined quality thresholds.

In some examples of the method 800, evaluating 810 the quality of image data corresponding to the sub-portion (314, 315) comprises calculating an average contrast within the sub-portion (314, 315). In some examples, adjusting 814 the one or more image-capture parameters of the camera (202) comprises resizing a focal length (222) of a lens (218) of the camera (202).

In accordance with one or more examples of this disclosure, evaluating 810 the quality of image data corresponding to the sub-portion (314, 315) comprises evaluating a dispersion of brightness values corresponding to the sub-portion (314, 315). Various ways of evaluating dispersion of brightness values can be used. See for example, U.S. Pat. No. 9,584,733 entitled "High Dynamic Range Transition" and "How to Read and Use Histograms" by Darlene Hildebrandt, which are fully incorporated herein. In at least one example, adjusting 814 the one or more image-capture parameters of the camera (202) comprises resizing an aperture (227) of the camera (202).

In some examples, the method 800 further includes: enhancing, using the processor (206), a color balance of the sub-portion (314, 315) corresponding to the region of interest (304, 306); and rendering the enhanced sub-portion (314, 315) using a display device (132).

Figure 9:
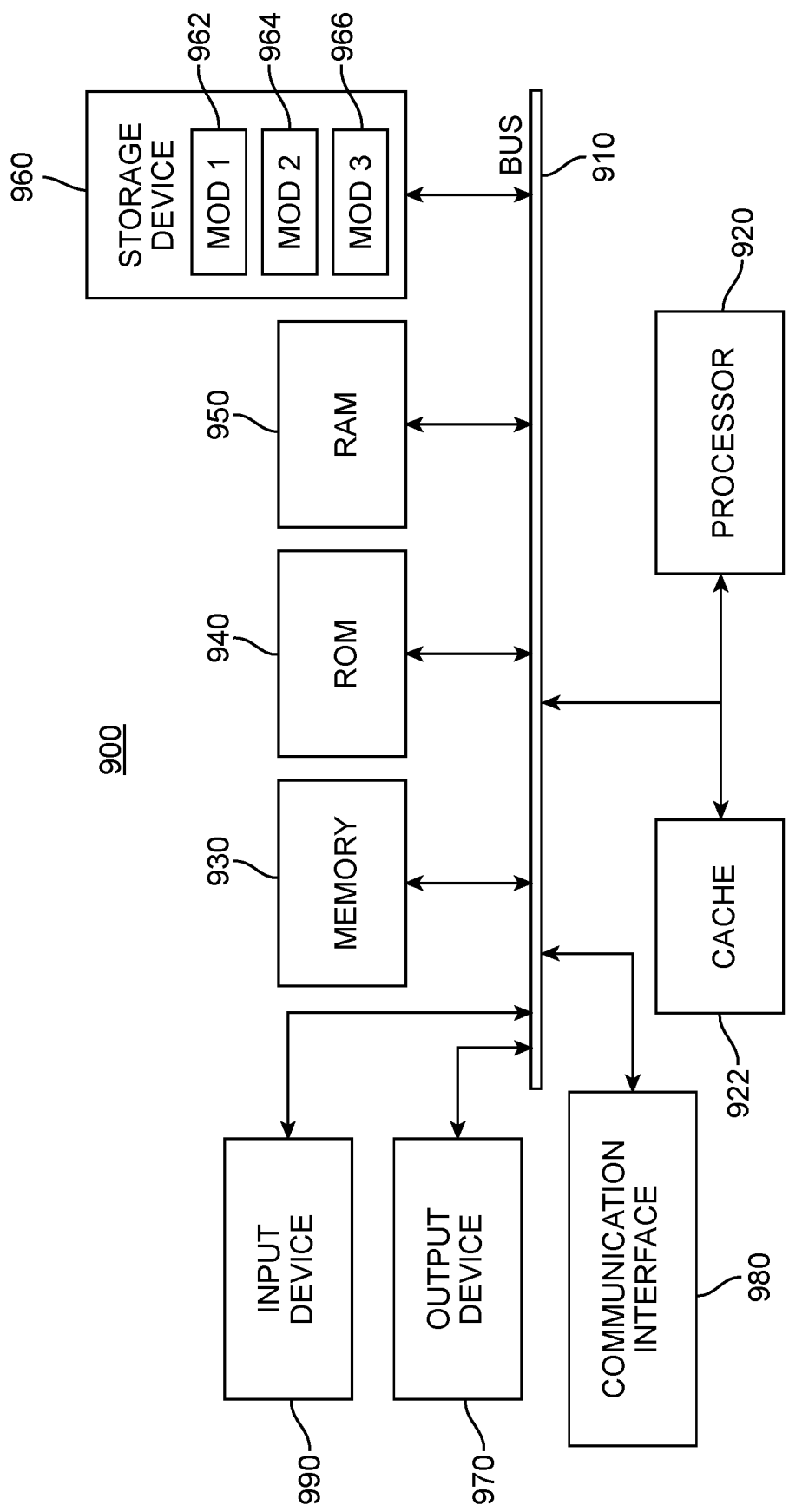
FIG. 9 illustrates an electronic device which can be employed to practice the concepts and methods of this disclosure.

FIG. 9 illustrates an electronic device 900 (e.g., 100, 200) which can be employed to practice the concepts and methods described. The components disclosed described can be incorporated in whole or in part into tablet computers, personal computers, handsets and other devices utilizing one or more microphones. As shown, device 900 can include a processing unit (CPU or processor) 920 and a system bus 910. System bus 910 interconnects various system components—including the system memory 930 such as read only memory (ROM) 940 and random-access memory (RAM) 950—to the processor 920. The processor 920 can comprise one or more digital signal processors. The device 900 can include a cache 922 of high-speed memory connected directly with, near, or integrated as part of the processor 920. The device 900 copies data from the memory 930 and/or the storage device 960 to the cache 922 for quick access by the processor 920. In this way, the cache provides a performance boost that avoids processor 920 delays while waiting for data. These and other modules can control or be configured to control the processor 920 to perform various actions. Other system memory 930 may be available for use as well. The memory 930 can include multiple different types of memory with different performance characteristics. The processor 920 can include any general-purpose processor and a hardware module or software module, such as module 1 (962), module 2 (964), and module 3 (966) stored in storage device 960, configured to control the processor 920 as well as a special-purpose processor where software instructions are incorporated into the actual processor design. The processor 920 may essentially be a completely self-contained computing system, containing multiple cores or processors, a bus, memory controller, cache, etc. A multi-core processor may be symmetric or asymmetric.

The system bus 910 may be any of several types of bus structures including a memory bus or memory controller, a peripheral bus, and a local bus using any of a variety of bus architectures. A basic input/output system (BIOS) stored in ROM 940 or the like, may provide the basic routine that helps to transfer information between elements within the device 900, such as during start-up. The device 900 further includes storage devices 960 such as a hard disk drive, a magnetic disk drive, an optical disk drive, tape drive or the like. The storage device 960 can include software modules 962, 964, 966 for controlling the processor 920. Other hardware or software modules are contemplated. The storage device 960 is connected to the system bus 910 by a drive interface. The drives and the associated computer readable storage media provide nonvolatile storage of computer readable instructions, data structures, program modules and other data for the device 900. In at least one example, a hardware module that performs a function includes the software component stored in a non-transitory computer-readable medium coupled to the hardware components—such as the processor 920, bus 910, output device 970, communication interface 980, input device 990, and so forth—necessary to carry out the function.

For clarity of explanation, the device of FIG. 9 is presented as including individual functional blocks including functional blocks labeled as a "processor." The functions these blocks represent may be provided using either shared or dedicated hardware, including, but not limited to, hardware capable of executing software and hardware, such as a processor 920, that is purpose-built to operate as an equivalent to software executing on a general-purpose processor. For example, the functions of one or more processors presented in FIG. 9 may be provided by a single shared processor or multiple processors. (Use of the term "processor" should not be construed to refer exclusively to hardware capable of executing software.) One or more examples of this disclosure include microprocessor hardware, and/or digital signal processor (DSP) hardware, read-only memory (ROM) 940 for storing software performing the operations discussed in one or more examples below, and random-access memory (RAM) 950 for storing results. Very large-scale integration (VLSI) hardware embodiments, as well as custom VLSI circuitry in combination with a general-purpose DSP circuit, can also be used.

Examples of this disclosure also include:

1. A teleconferencing system (100), comprising: a camera (202), wherein the camera (202) is configured to capture an image data stream comprising one or more image data frames (300) in accordance with one or more image-capture parameters; and a processor (206) coupled to the camera (202), wherein the processor (206) is configured to: receive the image data stream from the camera (202); determine a region of interest (304, 306) within an image data frame (300) of the image data stream; identify a sub-portion (314, 315) of the image data frame (300) corresponding to the region of interest (304, 306); evaluate a quality of image data corresponding to the sub-portion (314, 315); determine that the quality of the image data corresponding to the sub-portion (314, 315) is below one or more predetermined quality thresholds; and update one or more of the image-capture parameters of the camera (202), responsive to determining that the quality of the image data corresponding to the sub-portion (314, 315) is below the one or more predetermined quality thresholds.

2. The teleconferencing system (100) of example 1, wherein the processor (206) is further configured to evaluate the quality of image data corresponding to the sub-portion (314, 315) by calculating an average contrast within the sub-portion (314, 315).

3. The teleconferencing system (100) of example 1, wherein the processor (206) is further configured to update the one or more image-capture parameters of the camera (202) by adjusting a focal length (222) of a lens (218) of the camera (202).

4. The teleconferencing system (100) of example 1, wherein the processor (206) is further configured to evaluate the quality of image data corresponding to the sub-portion (314, 315) by determining a dispersion of brightness values corresponding to the sub-portion (314, 315).

5. The teleconferencing system (100) of example 1, wherein the processor (206) is further configured to update the one or more image-capture parameters of the camera (202) by adjusting a size of an aperture (227) of the camera (202).

6. The teleconferencing system (100) of example 1, wherein the processor (206) is further configured to update the one or more image-capture parameters of the camera (202) by: adjusting an exposure time of a light sensor (228) of the camera (202), wherein the exposure time corresponds to a length of time the light sensor (228) is exposed before image data sensed by the light sensor (228) is captured for receipt by the processor (206) within an image data frame (300) of the image data stream.

7. The teleconferencing system (100) of example 1, wherein the processor (206) is further configured to transmit an audio-video stream to a remote endpoint (102), the audio-video stream comprising: the sub-portion (314, 315) of the image data frame (300) corresponding to the region of interest (304, 306); and one or more sub-portions (314, 315) of one or more image data frames (300) captured using the camera (202) in accordance with the updated one or more image-capture parameters.

8. A non-transitory computer readable memory (210, 930) storing instructions executable by a processor (206), wherein the instructions comprise instructions to: receive an image data stream from a camera (202), the image data stream comprising one or more image data frames (300) captured by the camera (202) in accordance with one or more image-capture parameters; determine a region of interest (304, 306) within an image data frame (300) of the image data stream; identify a sub-portion (314, 315) of the image data frame (300) corresponding to the region of interest (304, 306); evaluate a quality of image data corresponding to the sub-portion (314, 315); determine that the quality of the image data corresponding to the sub-portion (314, 315) is below one or more predetermined quality thresholds; and update one or more of the image-capture parameters of the camera (202), responsive to determining that the quality of the image data corresponding to the sub-portion (314, 315) is below the one or more predetermined quality thresholds.

9. The non-transitory computer readable memory (210, 930) of example 8, wherein the instructions to evaluate the quality of image data corresponding to the sub-portion (314, 315) comprise instructions to calculate an average contrast within the sub-portion (314, 315).

10. The non-transitory computer readable memory (210, 930) of example 8, wherein the instructions to update the one or more image-capture parameters of the camera (202) comprise instructions to adjust a focal length (222) of a lens (218) of the camera (202).

11. The non-transitory computer readable memory (210, 930) of example 8, wherein the instructions to evaluate the quality of image data corresponding to the sub-portion (314, 315) comprise instructions to determine a dispersion of brightness values corresponding to the sub-portion (314, 315).

12. The non-transitory computer readable memory (210, 930) of example 8, wherein the instructions to update the one or more image-capture parameters of the camera (202) comprise instructions to adjust a size of an aperture (227) of the camera (202).

13. The non-transitory computer readable memory (210, 930) of example 8, wherein the instructions to update the one or more image-capture parameters of the camera (202) comprise instructions to: adjust an exposure time of a light sensor (228) of the camera (202), wherein the exposure time corresponds to a length of time the light sensor (228) is exposed before image data sensed by the light sensor (228) is captured for receipt by the processor (206) within an image data frame (300) of the image data stream.

14. The non-transitory computer readable memory (210, 930) of example 8, wherein the instructions further comprise instructions to transmit an audio-video stream through a transceiver to a remote endpoint (102), wherein the audio-video stream includes: the sub-portion (314, 315) of the image data frame (300) corresponding to the region of interest (304, 306); and one or more sub-portions (314, 315) of one or more image data frames (300) captured using the camera (202) in accordance with the updated one or more image-capture parameters.

The various examples described above are provided by way of illustration and should not be construed to limit the scope of the disclosure. Various modifications and changes can be made to the principles and examples described herein without departing from the scope of the disclosure and without departing from the claims which follow.

The invention claimed is:

1. A teleconferencing system, comprising:
 a camera, wherein the camera is configured to capture an image data stream comprising one or more image data frames in accordance with one or more image-capture parameters; and
 a processor coupled to the camera, wherein the processor is configured to:
  receive the image data stream from the camera;
  analyze the image data stream using an artificial neural network;
  determine a region of interest within an image data frame of the image data stream based on the analysis of the artificial neural network;
  identify a sub-portion of the image data frame corresponding to the region of interest;
  evaluate a quality of image data corresponding to the sub-portion;
  determine that the quality of the image data corresponding to the sub-portion is below one or more predetermined quality thresholds; and
  update one or more of the image-capture parameters of the camera, responsive to determining that the quality of the image data corresponding to the sub-portion is below the one or more predetermined quality thresholds.

2. The teleconferencing system of claim 1, wherein the processor is further configured to evaluate the quality of image data corresponding to the sub-portion by calculating an average contrast within the sub-portion.

3. The teleconferencing system of claim 1, wherein the processor is further configured to update the one or more image-capture parameters of the camera by adjusting a focal length of a lens of the camera.

4. The teleconferencing system of claim 1, wherein the processor is further configured to evaluate the quality of image data corresponding to the sub-portion by determining a dispersion of brightness values corresponding to the sub-portion.

5. The teleconferencing system of claim 1, wherein the processor is further configured to update the one or more image-capture parameters of the camera by adjusting a size of an aperture of the camera.

6. The teleconferencing system of claim 1, wherein the processor is further configured to update the one or more image-capture parameters of the camera by:
 adjusting an exposure time of a light sensor of the camera, wherein the exposure time corresponds to a length of time the light sensor is exposed before image data sensed by the light sensor is captured for receipt by the processor within an image data frame of the image data stream.

7. The teleconferencing system of claim 1, wherein the processor is further configured to transmit an audio-video stream to a remote endpoint, the audio-video stream comprising:
 the sub-portion of the image data frame corresponding to the region of interest; and
 one or more sub-portions of one or more image data frames captured using the camera in accordance with the updated one or more image-capture parameters.

8. A non-transitory computer readable medium storing instructions executable by a processor, wherein the instructions comprise instructions to:
 receive an image data stream from a camera, the image data stream comprising one or more image data frames captured by the camera in accordance with one or more image-capture parameters;
 analyze the image data stream using an artificial neural network;
 determine a region of interest within an image data frame of the image data stream based on the analysis of the artificial neural network;
 identify a sub-portion of the image data frame corresponding to the region of interest;
 evaluate a quality of image data corresponding to the sub-portion;
 determine that the quality of the image data corresponding to the sub-portion is below one or more predetermined quality thresholds; and
 update one or more of the image-capture parameters of the camera, responsive to determining that the quality of the image data corresponding to the sub-portion is below the one or more predetermined quality thresholds.

9. The non-transitory computer readable medium of claim 8, wherein the instructions to evaluate the quality of image data corresponding to the sub-portion comprise instructions to calculate an average contrast within the sub-portion.

10. The non-transitory computer readable medium of claim 8, wherein the instructions to update the one or more image-capture parameters of the camera comprise instructions to adjust a focal length of a lens of the camera.

11. The non-transitory computer readable medium of claim 8, wherein the instructions to evaluate the quality of image data corresponding to the sub-portion comprise instructions to determine a dispersion of brightness values corresponding to the sub-portion.

12. The non-transitory computer readable medium of claim 8, wherein the instructions to update the one or more image-capture parameters of the camera comprise instructions to adjust a size of an aperture of the camera.

13. The non-transitory computer readable medium of claim 8, wherein the instructions to update the one or more image-capture parameters of the camera comprise instructions to:

adjust an exposure time of a light sensor of the camera, wherein the exposure time corresponds to a length of time the light sensor is exposed before image data sensed by the light sensor is captured for receipt by the processor within an image data frame of the image data stream.

14. The non-transitory computer readable medium of claim 8, wherein the instructions further comprise instructions to transmit an audio-video stream through a transceiver to a remote endpoint, wherein the audio-video stream includes:

the sub-portion of the image data frame corresponding to the region of interest; and one or more sub-portions of one or more image data frames captured using the camera in accordance with the updated one or more image-capture parameters.

15. A method of optimizing capture and depiction of a region of interest at a teleconferencing endpoint, comprising:

capturing an image data stream using a camera, the image data stream comprising one or more image data frames captured by the camera in accordance with one or more image-capture parameters;

receiving the image data stream from the camera at a processor;

determining, using the processor, a region of interest within an image data frame of the image data stream by applying a focus estimation model in accordance with an artificial neural network;

identifying, using the processor, a sub-portion of the image data frame corresponding to the region of interest;

evaluating, using the processor, a quality of image data corresponding to the sub-portion;

determining, using the processor, that the quality of the image data corresponding to the sub-portion is below one or more predetermined quality thresholds; and adjusting, using the processor, one or more of the image-capture parameters of the camera, responsive to determining that the quality of the image data corresponding to the sub-portion is below the one or more predetermined quality thresholds.

16. The method of claim 15, wherein evaluating the quality of image data corresponding to the sub-portion comprises calculating an average contrast within the sub-portion.

17. The method of claim 15, wherein adjusting the one or more image-capture parameters of the camera comprises resizing a focal length of a lens of the camera.

18. The method of claim 15, wherein evaluating the quality of image data corresponding to the sub-portion comprises determining a dispersion of brightness values corresponding to the sub-portion.

19. The method of claim 15, wherein adjusting the one or more image-capture parameters of the camera comprises resizing an aperture of the camera.

20. The method of claim 19, further comprising:

enhancing, using the processor, a color balance of the sub-portion corresponding to the region of interest; and rendering the enhanced sub-portion using a display device.

21. The method of claim 15, wherein identifying, using the processor, the sub-portion of the image data frame corresponding to the region of interest comprises applying one or more image segmentation algorithms to the image data frame.

* * * * *